US 11,184,080 B2

(12) United States Patent
Nagaraja et al.

(10) Patent No.: US 11,184,080 B2
(45) Date of Patent: Nov. 23, 2021

(54) RADIO LINK MONITORING AND BEAM FAILURE RECOVERY RESOURCE CONFIGURATION AND OPERATION

(71) Applicant: QUALCOMM Incorporated, San Diego, CA (US)

(72) Inventors: Sumeeth Nagaraja, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/125,140

(22) Filed: Sep. 7, 2018

(65) Prior Publication Data

US 2019/0081691 A1   Mar. 14, 2019

Related U.S. Application Data

(60) Provisional application No. 62/557,002, filed on Sep. 11, 2017.

(51) Int. Cl.
*H04B 7/08* (2006.01)
*H04W 36/30* (2009.01)
(Continued)

(52) U.S. Cl.
CPC ........... *H04B 7/088* (2013.01); *H04B 7/0632* (2013.01); *H04B 7/0695* (2013.01);
(Continued)

(58) Field of Classification Search
CPC .... H04B 7/088; H04B 7/0695; H04B 17/309; H04B 7/0632; H04W 36/305;
(Continued)

(56) References Cited

U.S. PATENT DOCUMENTS

2012/0108177 A1   5/2012 Miao et al.
2014/0043988 A1   2/2014 Chen et al.
(Continued)

FOREIGN PATENT DOCUMENTS

CN   104205697 A   12/2014
CN   105519167 A   4/2016

OTHER PUBLICATIONS

Huawei et al., "Discussion on Remaining Issues of Radio Link Monitoring", 3GPP Draft; R1-1709921, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051299146, Retrieved from the Internet: URL:http://www.3gpp.org/ftp/Meetings_3GPP_SYNC/RAN1/Docs/ [retrieved on Jun. 26, 2017], 4 pages.
(Continued)

Primary Examiner — Fitwi Y Hailegiorgis
(74) Attorney, Agent, or Firm — Qualcomm Incorporated

(57) ABSTRACT

Certain aspects of the present disclosure provide to techniques for radio link monitoring (RLM), detecting beam failure, and beam failure recovery (BFR) using radio link monitoring reference signal (RML-RS) resources and beam failure recovery reference signal (BFR-RS) resources. An exemplary method by a user equipment (UE) may include obtaining a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link, obtaining a first indication that a first link quality for the first link is below a first threshold and a second link quality for the second link is
(Continued)

above a second threshold, and taking action regarding a radio link failure (RLF) based on the indication.

28 Claims, 13 Drawing Sheets

(51) Int. Cl.

| | |
|---|---|
| *H04B 7/06* | (2006.01) |
| *H04B 17/309* | (2015.01) |
| *H04W 36/00* | (2009.01) |
| *H04L 1/00* | (2006.01) |
| *H04W 56/00* | (2009.01) |
| *H04W 72/08* | (2009.01) |
| *H04W 16/28* | (2009.01) |
| *H04W 72/04* | (2009.01) |

(52) U.S. Cl.
CPC ......... *H04B 17/309* (2015.01); *H04L 1/0026* (2013.01); *H04W 36/0085* (2018.08); *H04W 36/305* (2018.08); *H04W 56/0005* (2013.01); *H04W 72/08* (2013.01); *H04W 16/28* (2013.01); *H04W 56/00* (2013.01); *H04W 72/046* (2013.01)

(58) Field of Classification Search
CPC ......... H04W 36/0085; H04W 56/0005; H04W 72/08; H04W 56/00; H04W 16/28; H04W 72/046; H04L 1/0026
USPC .................................................. 375/261, 262
See application file for complete search history.

(56) References Cited

U.S. PATENT DOCUMENTS

2017/0230780 A1    8/2017  Chincholi et al.
2019/0081689 A1*   3/2019  Yu ..................... H04W 74/0833
2019/0261344 A1*   8/2019  Grant .................. H04B 7/0695
2020/0059397 A1*   2/2020  da Silva ............... H04L 7/0008

OTHER PUBLICATIONS

Catt: "NR Radio Link Monitoring," 3GPP Draft; R1-1712362 NR Radio Link Monitoring, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017, Aug. 28, 2017, XP051315178, 5 pages, Retrieved from the Internet: URL: http://www.3gpp.org/ftp/Meetings_3GPP_SYNC/RAN1/Docs/ [retrieved on Aug. 20, 2017].

International Search Report and Written Opinion—PCT/US2018/050181—ISA/EPO—dated Nov. 9, 2018.

QUALCOMM Incorporated: "Considerations of RLM/RLF in NR", 3GPP Draft; R2-1706909 RLM-RLF, 3rd Generation Partnership Project (3GPP), Mobile Competence Centre; 650, Route Des Lucioles; F-06921 Sophia Antipolis Cedex; France, vol. RAN WG2, No. Qingdao, China; Jun. 27, 2017-Jun. 29, 2017, Jun. 26, 2017 (Jun. 26, 2017), pp. 1-4, XP051301406, Retrieved from the Internet: URL: http://www.3gpp.org/ftp/Meetings_3GPP_SYNC/RAN2/Docs/ [retrieved on Jun. 26, 2017].

QUALCOMM Incorporated: "Discussion of RLF Caused by Beam Failure Recovery," 3GPP Draft; R2-1805201—Discussion on RLF Caused by Beam Failure Recovery, 3rd Generation Partnership Project (3GPP), Mobile Competence Centre; 650, Route Des Lucioles; F-06921 Sophia-Antipolis Cedex, vol. RAN WG2, No. Sanya, China; Apr. 16, 2018-Apr. 20, 2018, Apr. 14, 2018, XP051428876, 6 pages, Retrieved from the Internet: URL: http://www.3gpp.org/ftp/Meetings%5F3GPP%5FSYNC/RAN2/Docs/ [retrieved on Apr. 14, 2018].

* cited by examiner

RADIO LINK MONITORING AND BEAM FAILURE RECOVERY RESOURCE CONFIGURATION AND OPERATION

CROSS-REFERENCE TO RELATED APPLICATIONS

The present application for patent claims priority to and benefit of U.S. Provisional Application No. 62/557,002, filed Sep. 11, 2017, which is assigned to the assignee hereof and hereby expressly incorporated by reference herein in its entirety.

BACKGROUND

Field of the Disclosure

Aspects of the present disclosure relate to wireless communications systems, and, more particularly, to techniques for radio link monitoring (RLM), detecting beam failure, and beam failure recovery (BFR) using radio link monitoring reference signal (RML-RS) resources and beam failure recovery reference signal (BFR-RS) resources.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for determining when a UE is in an area wherein a coverage mismatch exists between the UE's radio link monitoring reference signal (RLM-RS) resources and the UE's beam failure recovery reference signal (BFR-RS) resources. The UE and its serving BS may take one or more actions based on determining a coverage mismatch for the UE.

Certain aspects of the present disclosure provide a method for wireless communication that may be performed, for example, by a user equipment (UE). The method generally includes obtaining a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link, obtaining a first indication that a first link quality for the first link is below a first threshold and a second link quality for the second link is above a second threshold, and taking action regarding a radio link failure (RLF) based on the indication.

Certain aspects of the present disclosure provide a method for wireless communication that may be performed, for example, by a base station (BS). The method generally includes providing, to a user equipment (UE), a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link, obtaining from the UE a report that indicates a first link quality for the first link is below a first threshold, a second link quality for the second link is above a second threshold, and the BFR-RS resource corresponding to the second link, and providing a second configuration to the UE, wherein the second configuration includes the BFR-RS resource indicated in the report as an RLM-RS resource.

Certain aspects of the present disclosure provide a method for wireless communication that may be performed, for example, by a UE. The method generally includes obtaining a configuration indicating one or more radio link monitoring reference signal (RLM-RS) resources and one or more beam failure recovery reference signal (BFR-RS) resources, transmitting a beam failure recovery request via at least a first resource, and taking action regarding a radio link failure (RLF) when the first resource is not included in the one or more RLM-RS resources or when the UE receives a response for the beam failure recovery request.

Certain aspects of the present disclosure provide a method for wireless communication that may be performed, for example, by a base station (BS). The method generally includes providing, to a user equipment (UE), a first configuration indicating one or more radio link monitoring reference signal (RLM-RS) resources and one or more beam failure recovery reference signal (BFR-RS) resources, receiving a beam failure recovery request from the UE via a first resource included in the one or more BFR-RS resources, and providing a second configuration to the UE, wherein the second configuration includes the first resource as an RLM-RS resource.

Aspects include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
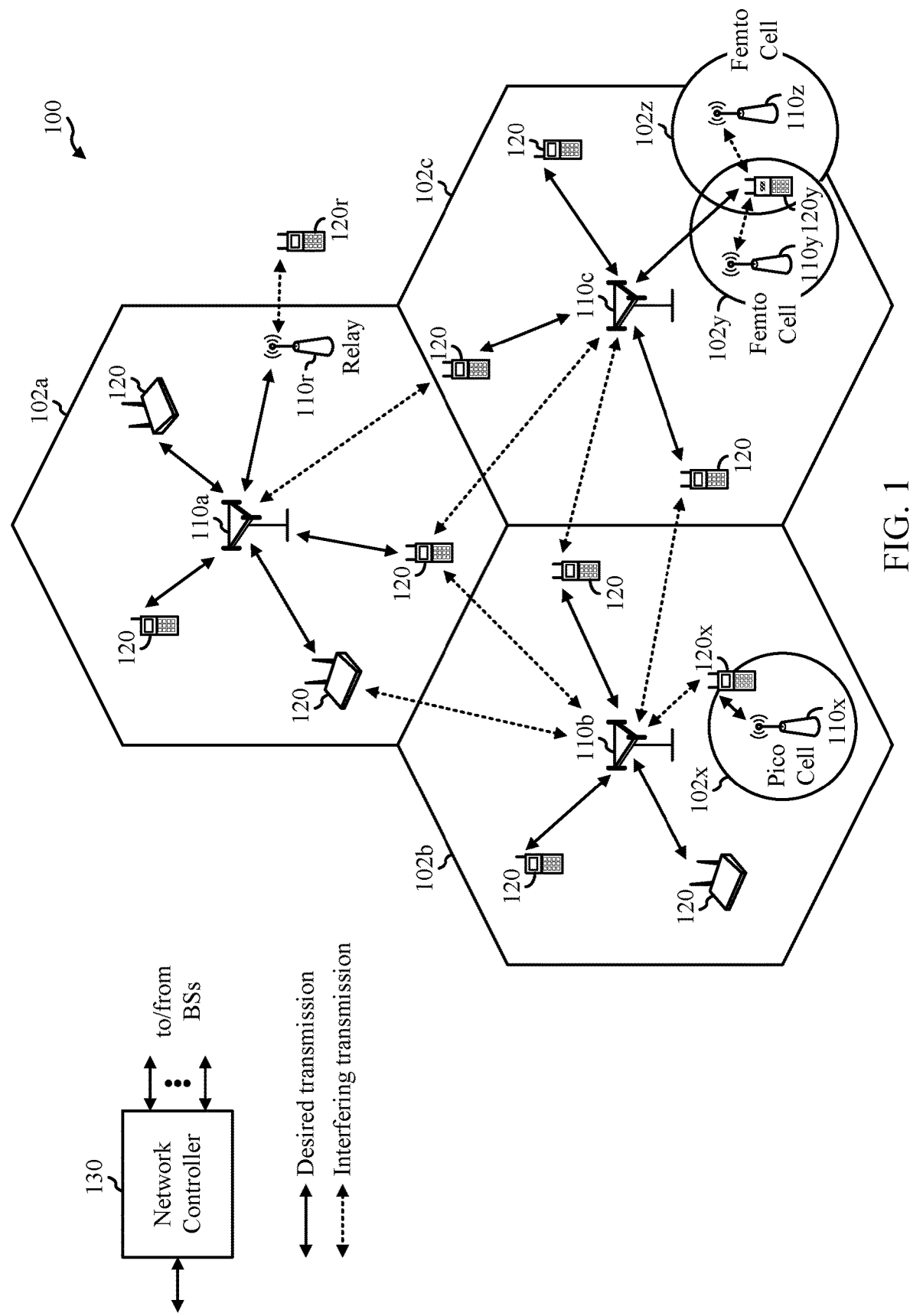
FIG. 1 is a block diagram conceptually illustrating an example telecommunications system, in accordance with certain aspects of the present disclosure.

Aspects of the present disclosure provide techniques and apparatus for radio link monitoring (RLM), detecting beam failure, and beam failure recovery (BFR) using radio link monitoring reference signal (RML-RS) resources and beam failure recovery reference signal (BFR-RS) resources.

In wireless communication systems employing beams, such as millimeter wave (mmW) systems, high path loss may present a challenge. Accordingly, techniques including hybrid beamforming (analog and digital), which are not present in 3G and 4G systems, may be used in mmW systems. Hybrid beamforming creates narrow beam patterns to users (e.g., UEs), which may enhance link budget/SNR.

In communication systems employing beams, a BS and UE may communicate over active beams. Active beams may be referred to as serving beams, reference beams, or quasi-collocated (quasi-collocation, QCL) beams. Stated otherwise, according to an example, active beams, serving beams, reference beams, and QCL beams may be used interchangeably. According to an example, QCL beams refer to transmissions using the same or similar beamforming as active or serving beams for which the QCL beam serves as a reference. Accordingly, QCL beams experience similar channel conditions for the active or serving beams.

Two antenna ports are said to be quasi co-located if properties of the channel over which a symbol on one antenna port is conveyed can be inferred from the channel over which a symbol on the other antenna port is conveyed. QCL supports beam management functionality including determining/estimating spatial parameters, frequency/timing offset estimation functionality including determining/estimating Doppler/delay parameters, and radio resource management (RRM) functionality including determining/estimating average gain. A network (e.g., BS) may indicate to a UE that the UE's data and/or control channel may be transmitted in the direction of a transmitted reference signal. The UE may measure the reference signal to determine characteristics of the data and/or control channel.

According to one example, the BS may configure a UE with four beams, each associated with a different direction and different beam identification. The BS may indicate to the UE a switch from a current active beam to one of the four configured beams. Following a beam switch command, both the UE and BS may switch to a particular beam. When a reference beam is QCL to data or control beams, the measurements the UE makes associated with a reference signal transmitted on a reference beam applies to the data or control channel, respectively. In this manner, the performance of the data or control channel may be measured using quasi-collocated reference beams.

Active beams may include BS and UE beam pairs that carry data and control channels such as physical downlink shared channel (PDSCH), physical downlink control channel (PDCCH), physical uplink shared channel (PUSCH), and physical uplink control channel (PUCCH). As will be described in more detail herein with respect to FIG. 8, a BS (e.g., gNB) may broadcast cell-specific broadcast signals including, for example, NR synchronization (synch) signals (NR-SS) and PDCCH in a common search space (PDCCH-CSS) using broader beams. The BS may transmit UE-specific signals including, for example, PDCCH in a user-specific search space (PDCCH-USS) using narrower beams. The UE-specific signals may be transmitted using unicast transmissions. In general, unicast beams may have better coverage than broadcast beams due beam management and refinement procedures. Because certain information may be transmitted using the CSS, and not using the USS, a problem may arise when a UE is in the coverage area of a USS and not in the coverage area of the CSS. Aspects of the present disclosure provide methods and apparatus for identifying or determining a coverage mismatch and actions to take in response to the determined mismatch.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Aspects of the present disclosure provide apparatus, methods, processing systems, and computer readable mediums for new radio (NR) (new radio access technology or 5G technology). NR may support various wireless communication services, such as Enhanced mobile broadband (eMBB) services targeting wide bandwidth (e.g., 80 MHz and wider), millimeter wave (mmW) services targeting high carrier frequency (e.g., 27 GHz and higher), massive machine-type communications (mMTC) services targeting non-backward compatible machine-type communications (MTC) techniques, and/or mission critical services targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be implemented. For example, the wireless network may be a new radio (NR) or 5G network.

As will be described in more detail herein, in communication systems employing beams (e.g., beamformed communications), a UE may receive some information transmitted by a BS in a common search space (CSS) and some information transmitted by the BS in a user-specific search space (USS). As will be described in more detail with respect to FIG. 8, in certain scenarios, the UE may receive signals transmitted in the USS and not receive signals transmitted in the CSS. In such a coverage mismatch between the CSS and the USS, the UE may not receive certain information which may be transmitted via the CSS (and not via the USS). Aspects of the present disclosure provide methods for identifying a coverage mismatch and actions to take by the UE and/or BS in the event of an identified coverage mismatch.

According to another example, a UE may experience a coverage mismatch between a NR-SS/PBCH transmission and the USS. Similar to the example described above with respect to the coverage mismatch between the CSS and the USS, the UE may receive certain information transmitted via the USS and may not receive the NR-SS/PBCH. Aspects of the present disclosure provide methods for identifying this coverage mismatch and actions to take by the UE and/or BS in the event of a coverage mismatch between the NR-SS/PBCH and the USS.

UEs 120 may be configured to perform the operations 1000 and other methods described herein and discussed in more detail below regarding USS and CSS coverage mismatch. BS 110 may comprise a transmission reception point (TRP), Node B (NB), gNB, access point (AP), new radio (NR) BS, gNodeB, 5GNB, etc.). The NR network 100 may include the central unit. The BS 110 may perform complementary operations to the operations 1000 performed by the UE. The BS 110 may perform the operations 900 and other methods described herein regarding a UE's USS and CSS coverage mismatch.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
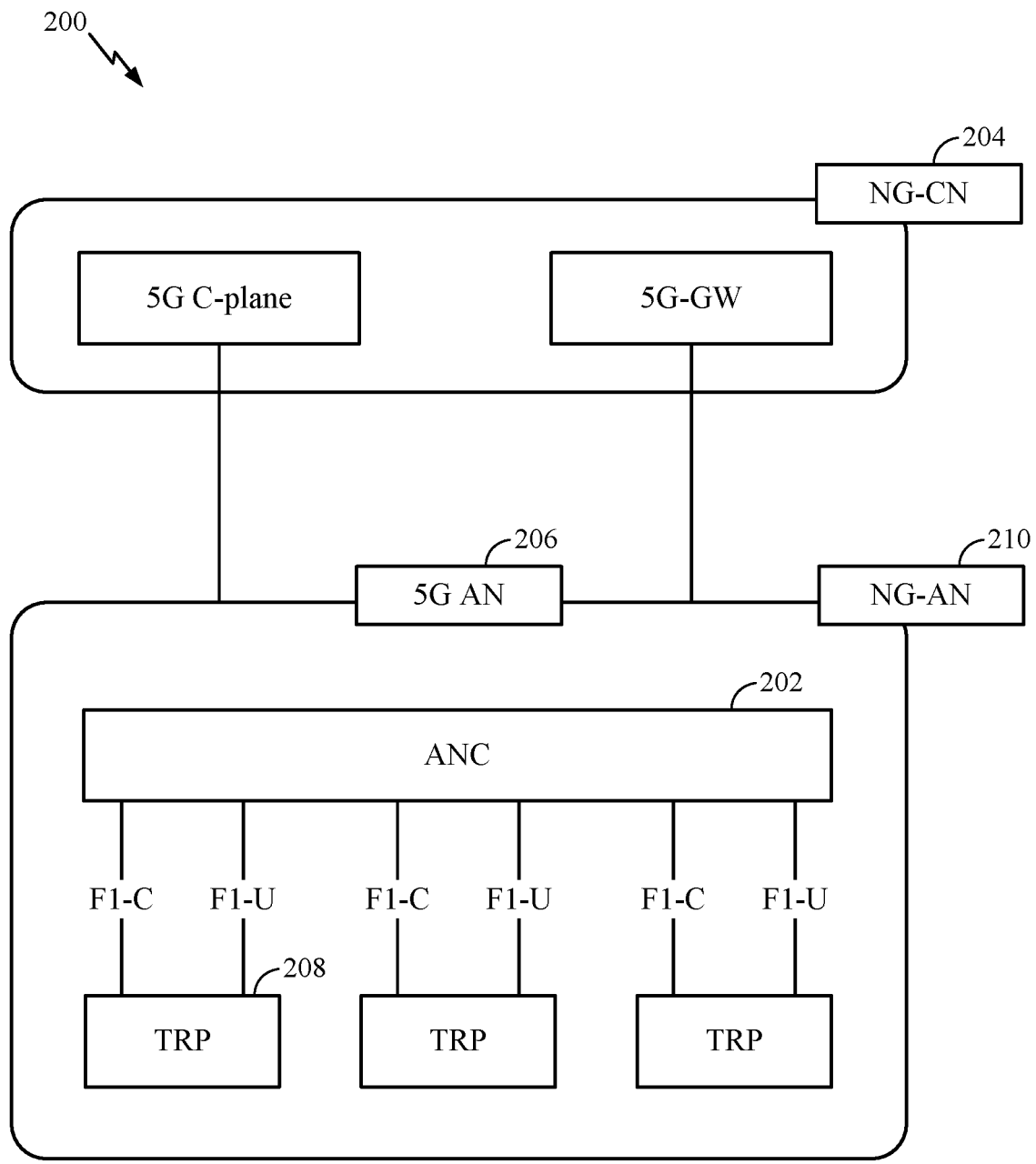
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
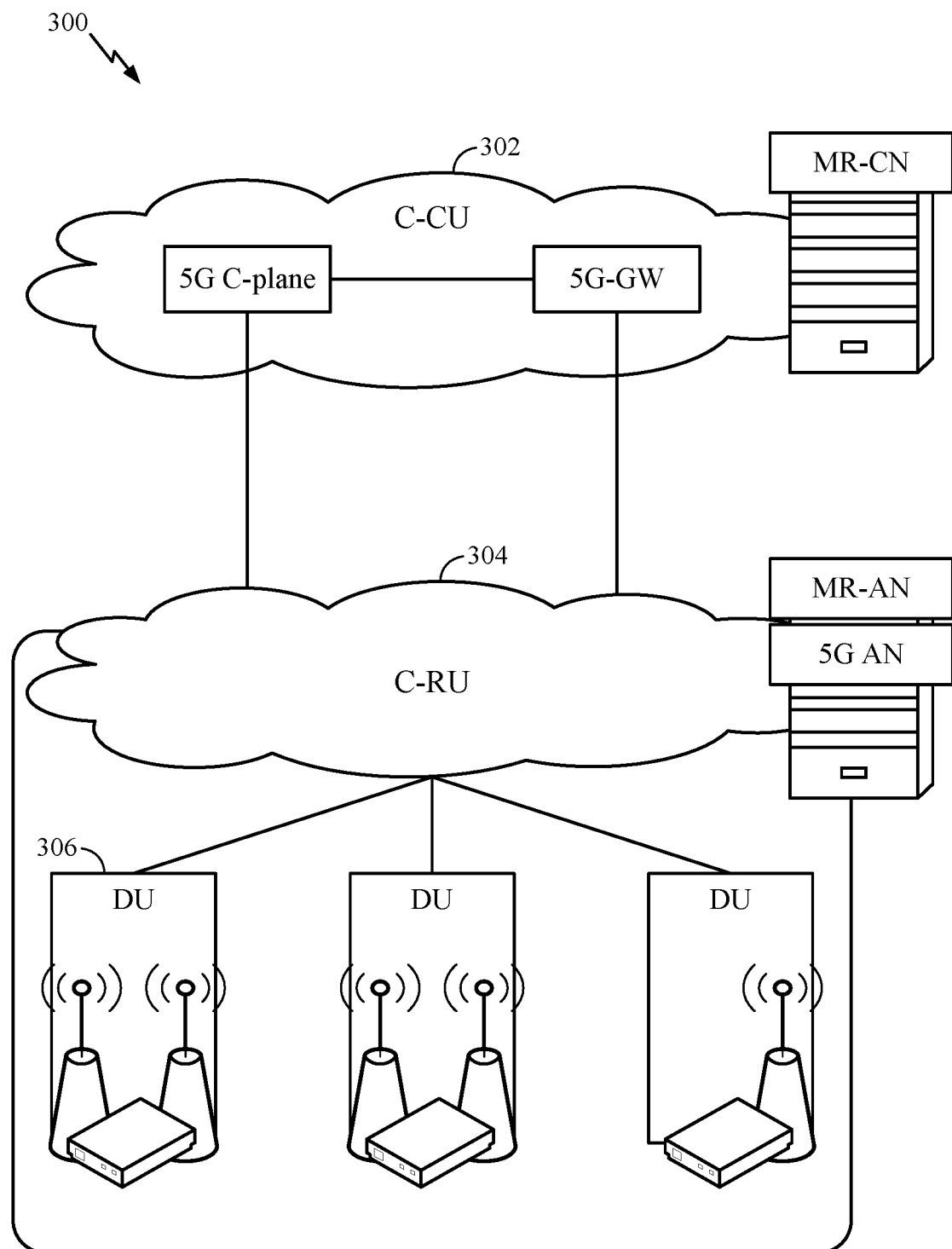
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
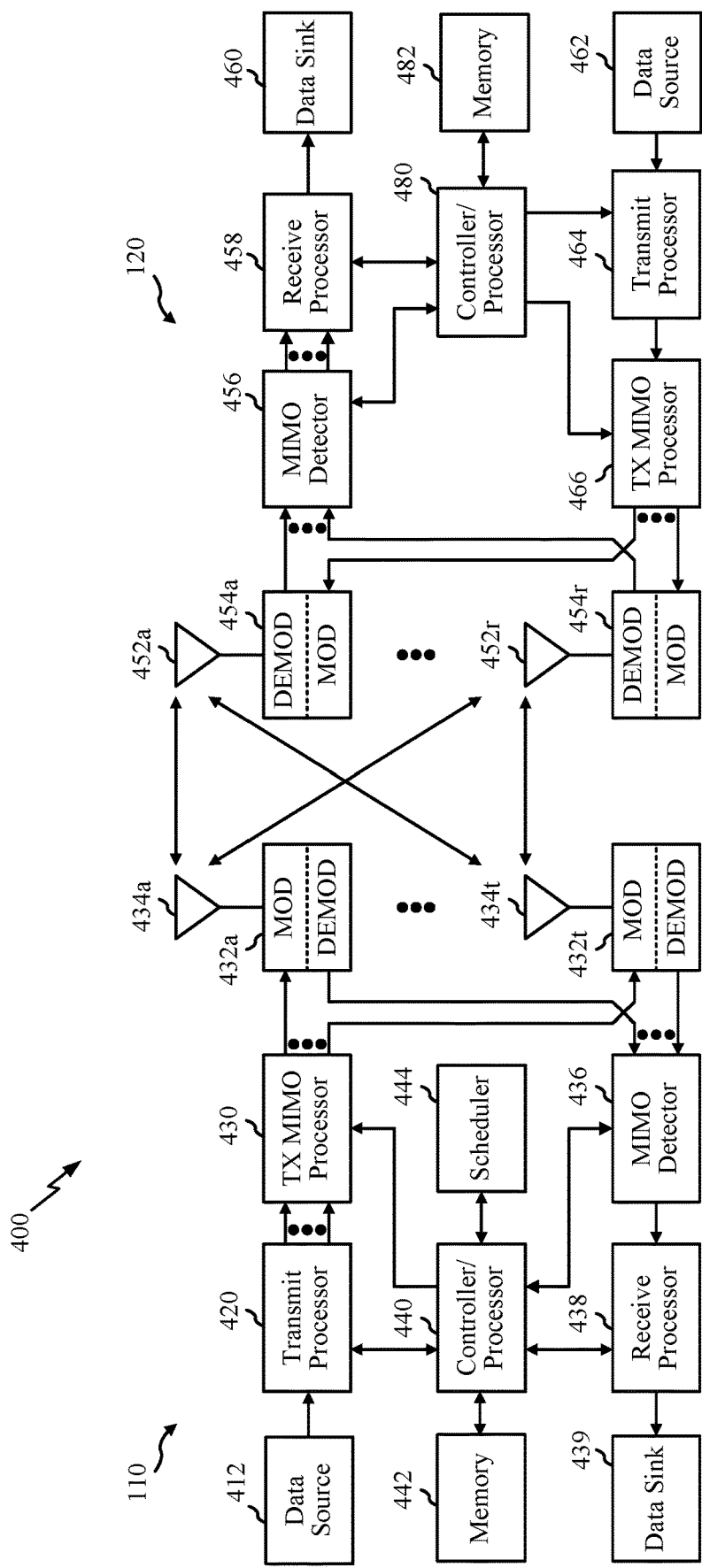
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or a gNB. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, Tx/Rx 432, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein and for those illustrated in the appended drawings. The processor 480 and/or other processors and modules at the UE 120 may also perform or direct, e.g., the execution of the functional blocks illustrated in FIG. 9, and/or other processes for the techniques described herein and those illustrated in the appended drawings. The memories 442 and 482 may store data and program codes for the BS 110 and the UE 120, respectively. A scheduler 444 may schedule UEs for data transmission on the downlink and/or uplink.

Figure 5:
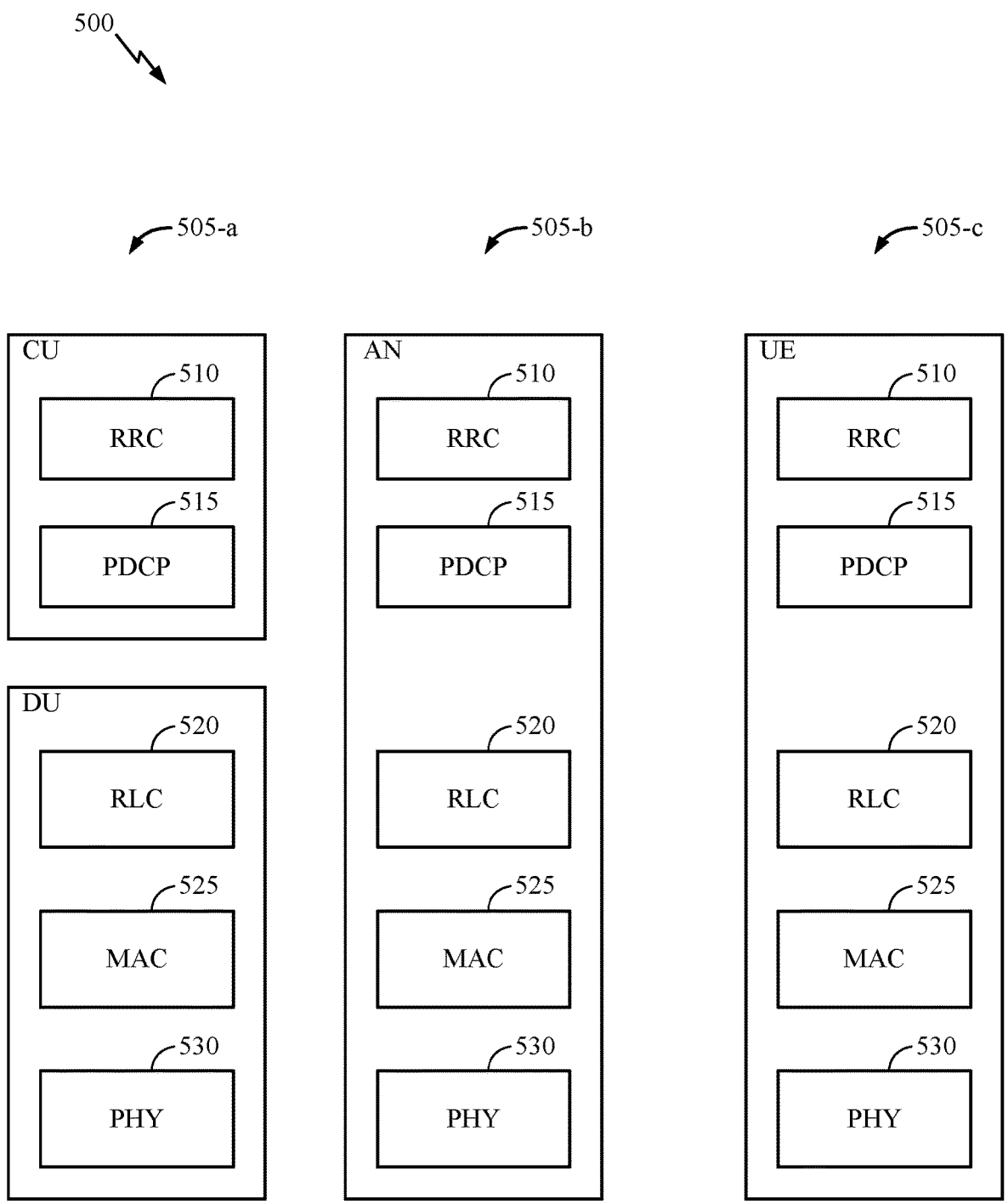
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., an access node (AN), a new radio base station (NR BS), a new radio Node-B (NR NB), a network node (NN)). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack 505-*c* (e.g., the RRC layer 510, the PDCP layer 515, the RLC layer 520, the MAC layer 525, and the PHY layer 530).

Figure 6:
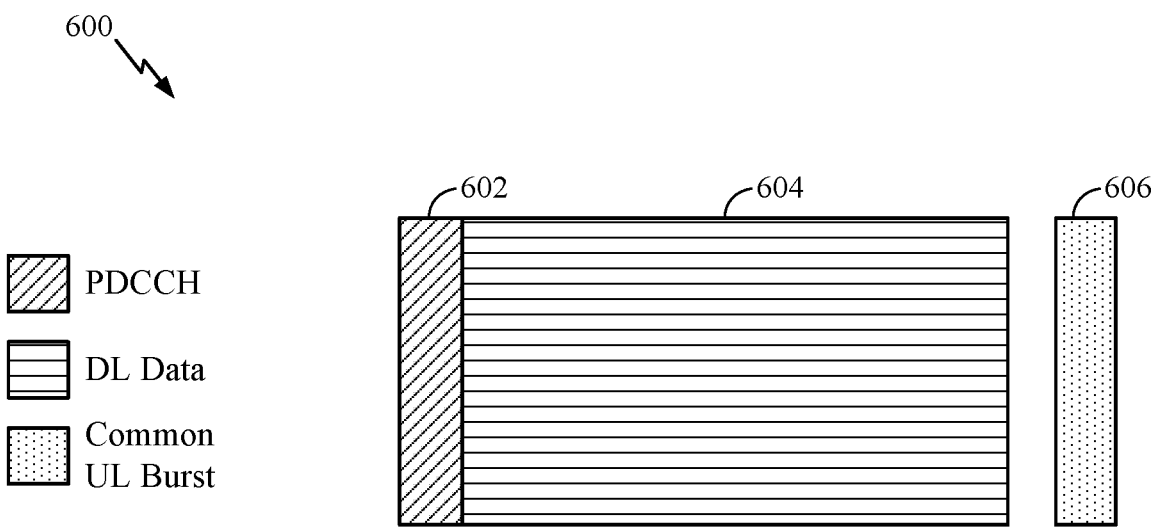
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
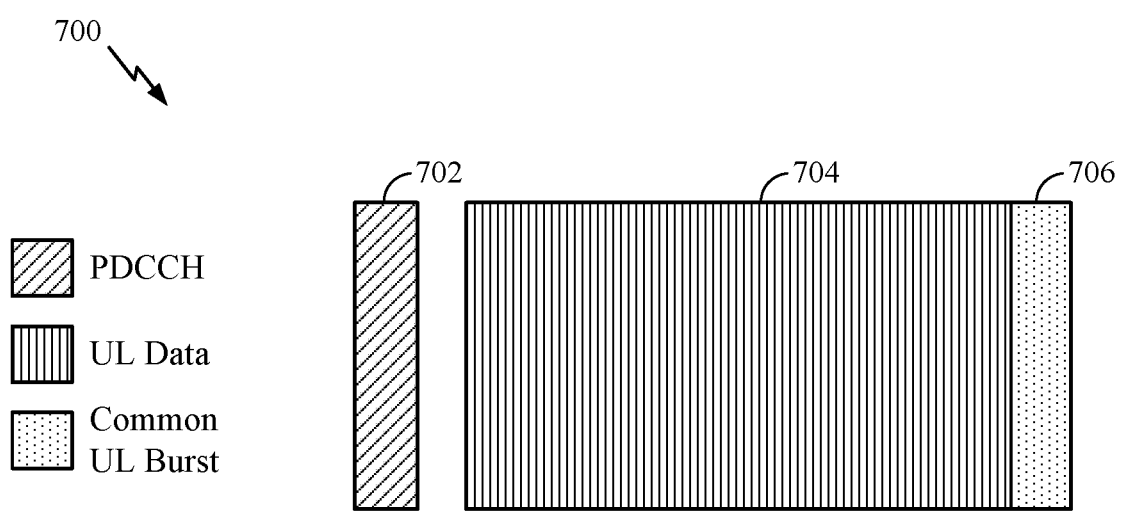
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Radio Link Monitoring and Beam Failure Recovery Resource Configuration and Operation Certain wireless communication standards use beamformed transmissions, wherein active beams are used to transmit and receive control and data. According to aspects of the present disclosure, active beams used for communication by a nodeB (NB) and a UE may be misaligned due to beam switch failure (e.g., beams being switched to other beams that experience so much interference or deep fade that communications are blocked) or signal blockage (e.g., caused by a UE moving into a shadow of a building).

In aspects of the present disclosure, a beam failure recovery procedure (e.g., performed by a UE and/or a network entity) can identify link issues and provide aperiodic in-synchronization (in-sync, IS) and aperiodic out-of-synchronization (out-of-sync, OOS) indications to higher layers (e.g., higher layers of a wireless communications protocol stack, as discussed above with reference to FIG. 5). For this purpose, a network entity (e.g., an access node, a cell, or a next generation NodeB (gNB)) may configure beam failure recovery reference signal (BFR-RS) resource(s) at a UE.

According to aspects of the present disclosure, a beam failure recovery procedure may identify issues with an active control beam (e.g., used for conveying PDCCH or PUCCH) based on measurements of one or more downlink (DL) reference signals (e.g., BFR-RS associated with the BFR-RS resources mentioned above).

In aspects of the present disclosure, a beam failure recovery procedure may also maintain a set of candidate beams. That is, a beam failure recovery procedure can include processes to determine a set of candidate beams, inform a wireless communications device (e.g., a UE or a BS) of the candidate beams, and update the wireless communications device when candidate beams are updated (e.g., in the event of a change in channel conditions). One or more candidate beams can be used to send a beam failure recovery request, if a UE or network entity determines that a beam failure (e.g., misalignment of a transmit beam and a receive beam of a beam pair) has occurred.

According to aspects of the present disclosure, a radio link monitoring procedure can identify link issues and provide periodic in-sync and out-of-sync indications to higher layers. For this purpose, a network entity may configures X radio link monitoring reference signal (RLM-RS) resource(s) at a UE.

Figure 8:
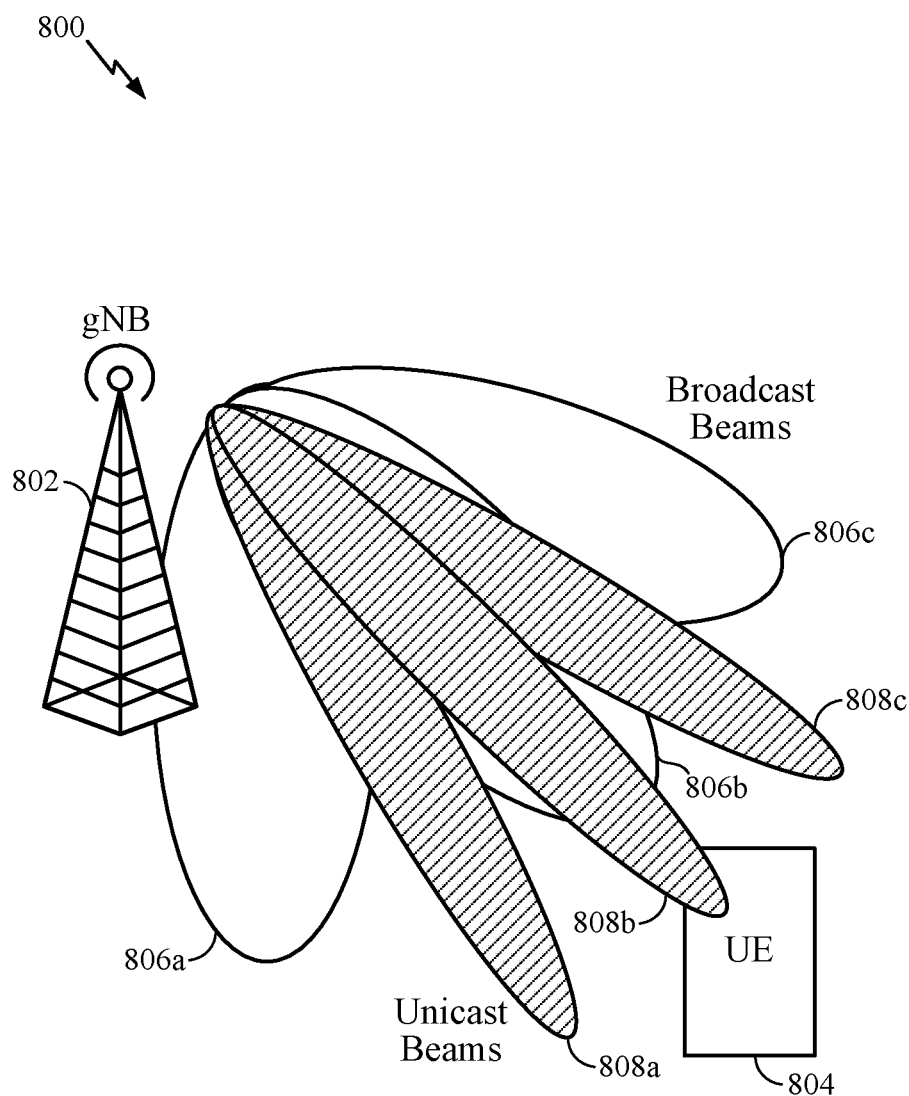
FIG. 8 illustrates an example of CSS and USS, in accordance with certain aspects of the present disclosure.

FIG. 8 illustrates an example 800 of beamformed communication including broadcast beams 806a, 806b, and 806c and unicast beams 808a, 808b, and 808c. While the example shows three broadcast beams and three unicast beams, the present disclosure is not so limited, and aspects of the present disclosure may be used in systems using more or fewer broadcast beams and more or fewer unicast beams. The broadcast beams may, for example, be used for transmitting channels via a common search space of the UE while the unicast beams are used for transmitting channels via a UE-specific search space of the UE. A BS (e.g., a gNB) 802 communicates with a UE 804 using active beams. The BS may transmit some signals using the broadcast beams and other signals using the unicast beams. In one example, the broadcast beams may include broadcast transmissions (e.g., transmissions intended for more than one UE). The unicast beams may include unicast transmissions. Unicast beams may have better coverage as compared to broadcast beams, for example, due to beam management and refinement procedures for unicast beams. As illustrated in FIG. 8, the broadcast beams 806 may be wider than the unicast beams 808. Additionally, the broadcast beams 806 may not reach as far as the narrower, unicast beams 808.

According to one example, information transmitted in the broadcast beams includes PDCCH and PDSCH to carry remaining minimum system information (RMSI). RMSI may include information similar to System Information Block-1 (SIB1) and SIB-2 in LTE. RMSI may be carried via PDSCHs and PDCCHs, which may provide grants for PDSCHs. In mmW systems, the RMSI may be beam swept, similar to a Master Information Block (MIB) in LTE. According to an example, RMSI may not be transmitted in the unicast beams.

As noted above, a UE entering the system may receive information via beams transmitted in the broadcast beams. Accordingly, the UE may receive RMSI via broadcast beams 806. After obtaining system information, the UE may be served using dedicated beams in the unicast beams 808. In certain scenarios, it may be possible that a UE is within the area of a unicast beam and not in the area of the broadcast beams.

By way of analogy, coverage of the broadcast beams and the unicast beams may be thought of as two concentric circles. The diameter of the circle representing the coverage area of the broadcast beams may be smaller than the diameter of the circle representing the coverage area of the unicast beams. Accordingly, a UE may be in the coverage area of the outer circle, representing the unicast beams and not in the coverage area of the inner circle, representing the broadcast beams. This scenario may be referred to as a broadcast and unicast coverage mismatch.

According to another example, a coverage mismatch may occur when a UE is in the coverage area of a unicast beam and not in the coverage area of a NR-SS or PBCH. Similar to RMSI, NR-SS and PBCH may not be transmitted in the unicast beams. NR-SS may include NR-primary synchronization signal (NR-PSS), NR-secondary synchronization signal (NR-SSS), and demodulation reference signal (DM-RS). Applying the analogy of two concentric circles used above, a UE may be in the coverage area of the outer circle which represents the unicast beams and may not be in the coverage area of the inner circle, which represents the NR-SS/PBCH.

With reference to FIG. 8, a UE may be in a coverage mismatch when it is in the coverage area of one of the unicast beams 808 and not in the coverage area of any of the broadcast beams 806. As illustrated, UE 804 may experience a coverage mismatch. Because some information may be transmitted using the broadcast beams and not using the unicast beams, UE 804 may not be able to receive the information transmitted via the broadcast beams. The BS 802 may be unaware of the UE's 804 coverage mismatch. Stated otherwise, the BS 802 may not know the UE 804 is only reachable by the BS using the unicast beams.

Because PBCH and RMSI are transmitted via broadcast beams that may not be receivable in a same coverage area as the unicast beams (for example, RMSI is transmitted in the broadcast beams), if the BS 802 changes the PBCH or the broadcast beams, the UE 804 may not be able to receive the PBCH and RMSI. A UE outside the coverage area of broadcast beams but within the coverage of a unicast beam(s) may observe good decoding performance on the PDCCH and corresponding PDSCH in the unicast beam(s) while failing to decode the PDCCH in the broadcast beams (e.g., failing to decode the RMSI), failing to detect the NR-SS, and/or failing to decode PBCH.

Advantageously, aspects of the present disclosure provide techniques for identifying a coverage mismatch and actions to take in the event of an identified coverage mismatch.

According to aspects of the present disclosure, the detection of an issue by a radio link monitoring (RLM) procedure by a device (e.g., a UE) may lead the device to begin a radio link failure (RLF) procedure. In aspects of the present disclosure, a relationship between an RLM procedure and an RLF procedure (e.g., an LTE RLF procedure) for a primary cell (PCell) and a primary secondary cell (PSCell) is described in the tables below. As shown in the tables below, an RLF procedure of a device may use two timers, referred to as T310 and T313, in determining whether to report a serving cell group (SCG) failure (e.g., an RLF for the SCG). The RLF procedure may also refer to constants, which may be configured or reconfigured based on network standards or configurations received from the network, in determining whether to start or stop the various timers.

| Timer | Start condition(s) | Stop condition(s) | Action(s) to perform at expiry of timer |
|---|---|---|---|
| T310 | Upon detecting physical layer problems for the PCell, i.e., upon receiving N310 (i.e., a first threshold number) consecutive | (1) Upon receiving N311 (i.e., a second threshold number) consecutive in-sync indications from lower layers for the PCell, (2) upon triggering the handover procedure, or (3) upon | If security is not activated: go to a radio resource control idle state (RRC_IDLE); otherwise, initiate a connection |

-continued

| Timer | Start condition(s) | Stop condition(s) | Action(s) to perform at expiry of timer |
|---|---|---|---|
|  | out-of-sync indications from lower layers | initiating the connection reestablishment procedure. | reestablishment procedure. |
| T313 | Upon detecting physical layer problems for the PSCell, i.e., upon receiving N313 (i.e., a third threshold number) consecutive out-of-sync indications from lower layers | (1) Upon receiving N314 (i.e., a fourth threshold number) consecutive in-sync indications from lower layers for the PSCell, (2) upon initiating the connection reestablishment procedure, (3) upon SCG release, or (4) upon receiving a radio resource control connection reconfiguration message (RRCConnectionReconfiguration) including a mobility control information secondary cell group (MobilityControlInfoSCG) information element (IE) | Inform E-UTRAN about the SCG radio link failure by initiating the SCG failure information procedure. |

| Constant | Usage |
|---|---|
| N310 | Maximum number of consecutive "out-of-sync" indications for the PCell received from lower layers before starting T310 timer for an RLF procedure for the PCell |
| N311 | Minimum number of consecutive "in-sync" indications for the PCell received from lower layers before stopping and resetting T310 timer |
| N313 | Maximum number of consecutive "out-of-sync" indications for the PSCell received from lower layers before starting T311 timer for and RLF procedure for the PSCell |
| N314 | Minimum number of consecutive "in-sync" indications for the PSCell received from lower layers before stopping and resetting the T311 timer |

According to aspects of the present disclosure, RLM-RS resource(s) and BFR-RS resource(s) for a UE may be configured with different sets of broadcast beams and/or unicast beams that can cause one or more issues as described below.

In aspects of the present disclosure, a UE may monitor an RLM-RS resource set to determine whether to send periodic OOS indications. If the RLM-RS resource set does not contain BFR-RS resource(s), then the physical layer (i.e., layer one (L1)) of the protocol stack of the UE may send periodic OOS indications to higher layers, even though the link quality metric based on BFR-RS resource(s) is good. For example, UE 804 (see FIG. 8) may be configured with RLM-RS resources that are included in the broadcast beams 806 configured via NR-SS or CSI-RS. In the example, the UE may also be configured with BFR-RS resources that are included in the unicast beams configured using NR-SS or CSI-RS. Still in the example, L1 of the UE may send periodic OOS indications to higher layers even though the link quality metric based on the BFR-RS resource set is good.

According to aspects of the present disclosure, a UE may monitor an RLM-RS resource set to send periodic IS indications. The UE may also be configured with one or more candidate RS resources (e.g., beam pairs) for reporting a beam failure, if the UE detects a beam failure. If the RLM-RS resource set does not contain a candidate RS resource(s) (i.e., BFR candidate RS resources), then L1 may not send periodic IS indications to higher layers even though the link quality metric based on BFR candidate RS resource(s) is good. For example, UE 804 (see FIG. 8) may be configured with RLM-RS resources that are included in the broadcast beams 806 configured via NR-SS or CSI-RS. In the example, the UE may also be configured with BFR-RS resources that are included in the unicast beams configured using NR-SS or CSI-RS. Still in the example, the UE may experience a deterioration of channel conditions, and L1 of the UE begins sending periodic OOS indications to higher layers. In the example, the UE channel conditions may then improve, such that the link quality metric based on the BFR-RS resource set is good. Still in the example, L1 of the UE may not begin sending in-sync indications because the RLM-RS resources that the UE uses in determining whether to send the in-sync indications do not include the BFR-RS resource set. In the example, the UE may declare an RLF because L1 of the UE does not start sending the in-sync indications.

Figure 9:
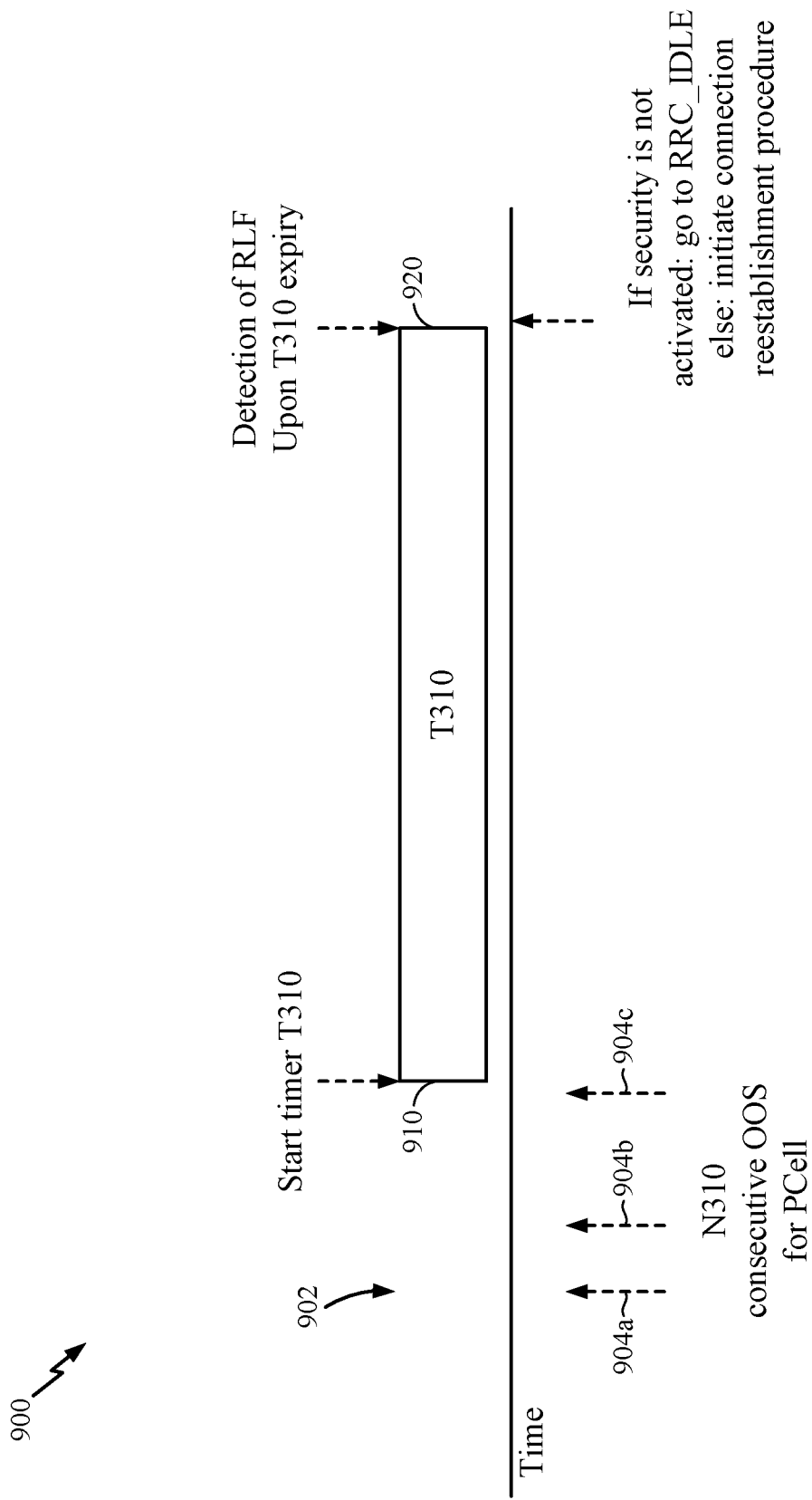
FIG. 9 illustrates an exemplary timeline for detection of physical layer problems in accordance with aspects of the present disclosure.

FIG. 9 illustrates an exemplary timeline 900 for detection of physical layer problems (e.g., misalignment of a transmit beam and a receive beam of an active beam pair), in accordance with aspects of the present disclosure. As shown at 902, a UE (e.g., UE 120 shown in FIG. 1 or UE 804 shown in FIG. 8) may begin counting OOS indications 904*a*, 904*b*, and 904*c* obtained from L1. Upon counting N310 (e.g., three) consecutive OOS indications for the PCell, the UE may start the timer T310, as shown at 910. At 920, the T310 timer expires, and the UE either transitions to a radio resource connection idle state (RRC_IDLE), if security is not activated, or the UE initiates a connection reestablishment procedure.

Figure 10:
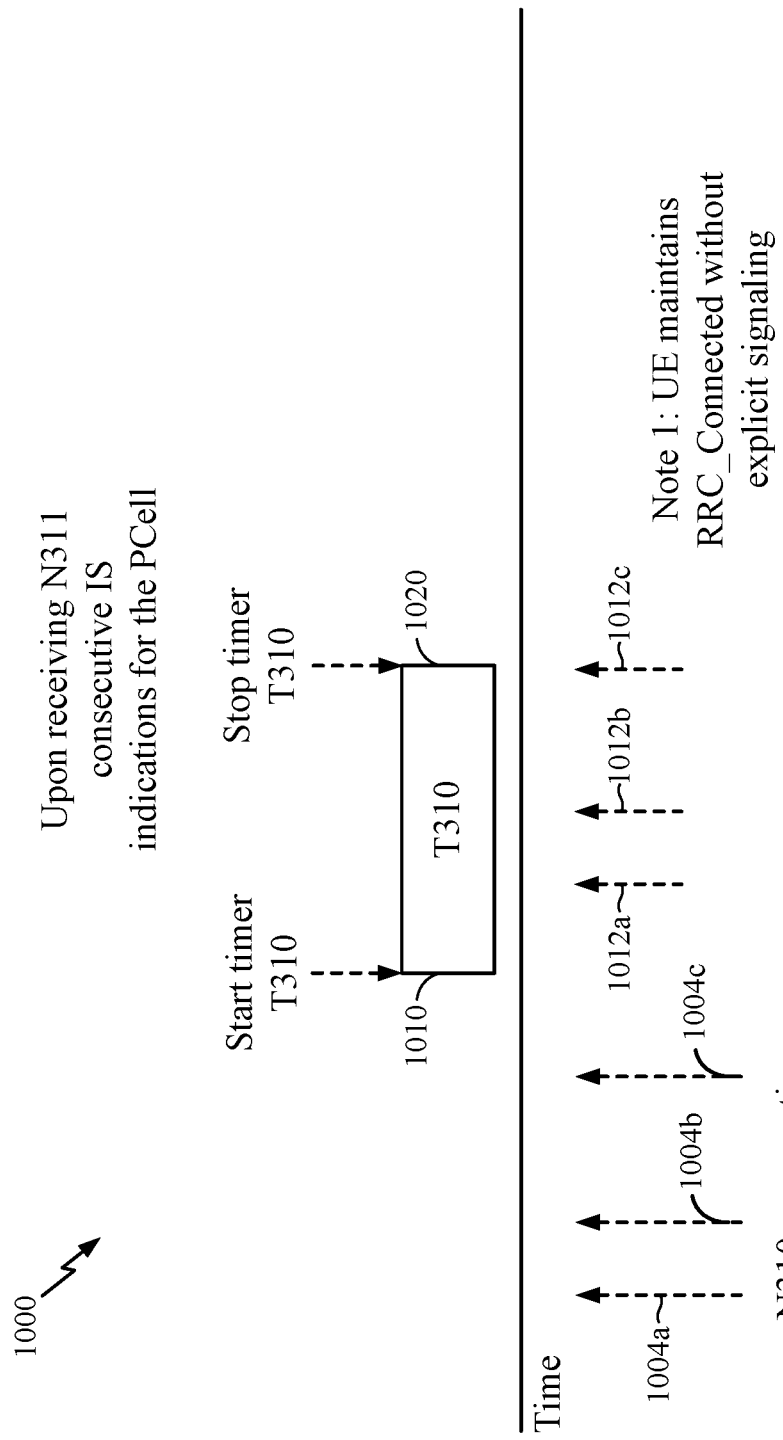
FIG. 10 illustrates an exemplary timeline for recovery from physical layer problems in accordance with aspects of the present disclosure.

FIG. 10 illustrates an exemplary timeline 1000 for recovery from physical layer problems (e.g., misalignment of a transmit beam and a receive beam of an active beam pair), in accordance with aspects of the present disclosure. As in FIG. 9, a UE (e.g., UE 120 shown in FIG. 1 or UE 804 shown in FIG. 8) may start the timer T310 at 1010, upon counting N310 consecutive OOS indications 1004*a*, 1004*b*, and 1004*c* for the PCell. While T310 is running, channel conditions improve and the UE counts consecutive in-sync indications 1012*a*, 1012*b*, and 1012*c*. At 1020, the UE has counted N311 (e.g., three) consecutive in-sync indications and stops the T310 timer (i.e., before the T310 timer expires). As illustrated, the UE can remain in an RRC connected state (e.g., RRC_Connected) with no other explicit signaling.

Figure 11:
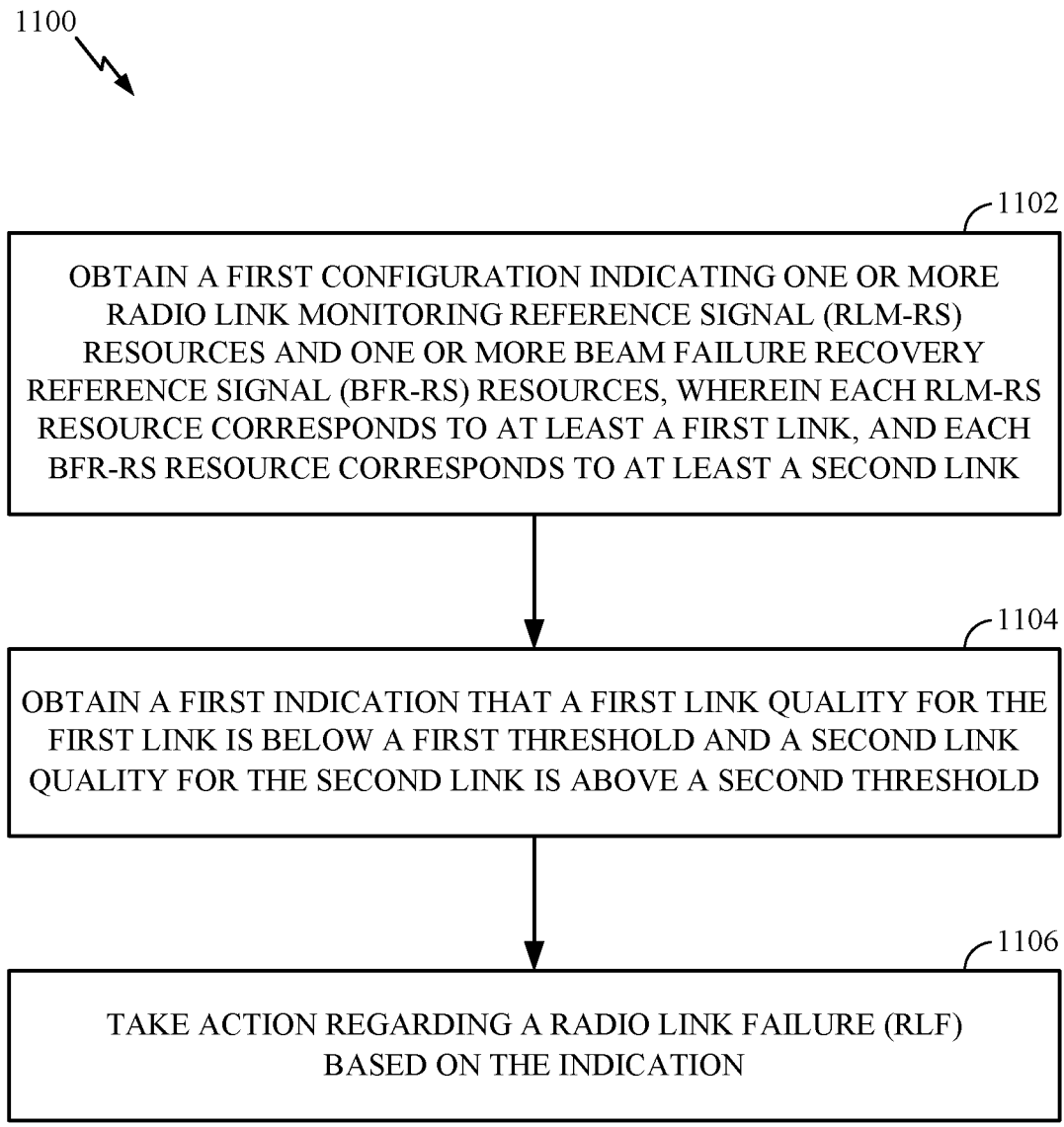
FIG. 11 illustrates example operations performed by a UE, in accordance with certain aspects of the present disclosure.

FIG. 11 illustrates example operations 1100 which may be performed by a UE (e.g., UE 120, shown in FIG. 1, or UE 804, shown in FIG. 8), according to aspects of the present disclosure. The UE may include one or more modules of UE 120 illustrated in FIG. 4.

At block 1102, operations 1100 begin with the UE obtaining a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link. For example, UE 804 obtains (e.g., receives in a transmission from BS 802) a first configuration indicating an RLM-RS resource (e.g., aligned with broadcast beam 806*b*) and a BFR-RS resource, wherein the RLM-RS resource corresponds to a first link (e.g., a broadcast link from BS 802 via broadcast beam 806*b*), and the BFR-RS resource corresponds to a second link (e.g., a unicast link from BS 802 via unicast beam 808*b*).

Operations 1100 continue at block 1104 with the UE obtaining a first indication that a first link quality for the first link is below a first threshold and a second link quality for the second link is above a second threshold. Continuing the example from above, the UE obtains a first indication that a first link quality for the first link (e.g., a reference signal received power (RSRP) for the broadcast link) and a second link quality for the second link (e.g., RSRP for the unicast link) is above a second threshold.

At block 1106, operations 1100 continue with the UE taking action regarding a radio link failure (RLF) based on the indication. Continuing the example from above, the UE takes action regarding an RLF (e.g., the UE sends a report to BS 802, wherein the report indicates that the first link quality is below the first threshold, the second link quality is above the second threshold, and the BFR-RS resource corresponding to the second link), based on the indication obtained in block 1104.

Figure 12:
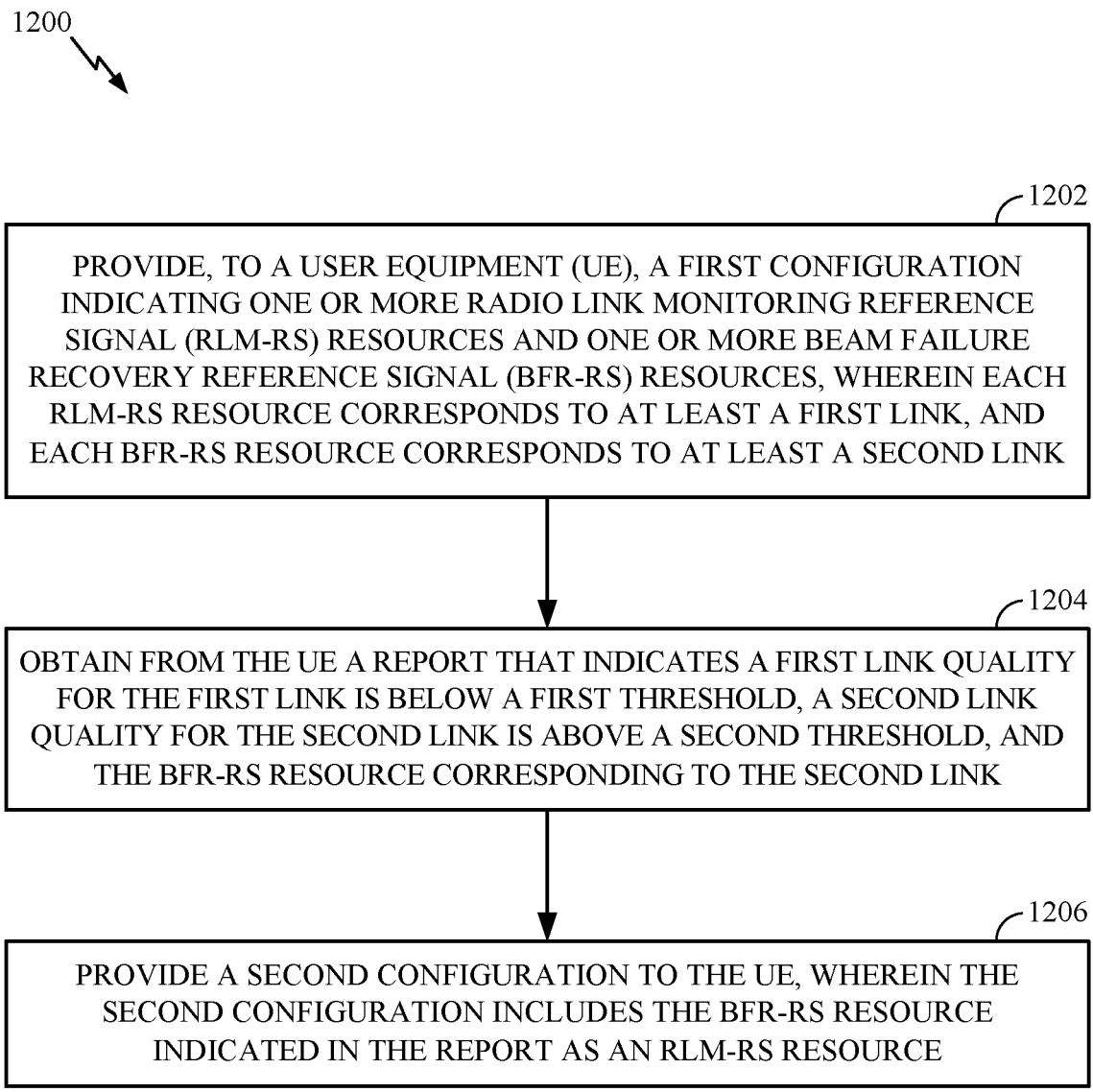
FIG. 12 illustrates example operations performed by a BS, in accordance with certain aspects of the present disclosure.

FIG. 12 illustrates example operations 1200 which may be performed by a BS (e.g., BS 110, shown in FIG. 1, or BS 802, shown in FIG. 8), according to aspects of the present disclosure. The BS may include one or more modules of BS 110 illustrated in FIG. 4. Operations 1200 may be considered complementary to operations 1100, shown in FIG. 11.

At block 1202, operations 1200 begin with the BS providing, to a user equipment (UE), a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link. For example, BS 802 provides (e.g., transmits), to UE 804, a first configuration indicating an RLM-RS resource (e.g., aligned with broadcast beam 806*b*) and a BFR-RS resource, wherein the RLM-RS resource corresponds to a first link (e.g., a broadcast link from BS 802 via broadcast beam 806*b*), and the BFR-RS resource corresponds to a second link (e.g., a unicast link from BS 802 via unicast beam 808*b*).

Operations 1200 continue at block 1204 with the BS obtaining from the UE a report that indicates a first link quality for the first link is below a first threshold, a second link quality for the second link is above a second threshold, and the BFR-RS resource corresponding to the second link. Continuing the example from above, the BS obtains (e.g., receives from UE 804) a report that indicates a first link quality for the first link (corresponding to the RLM-RS resource in block 1202) is below a first threshold and a second link quality for the second link is above a second threshold, and the BFR-RS resource corresponding to the second link (i.e., the link with quality above the second threshold).

At block 1206, operations 1200 continue with the BS providing a second configuration to the UE, wherein the second configuration includes the BFR-RS resource indicated in the report as an RLM-RS resource. Continuing the example from above, the BS provides (e.g., transmits) a second configuration to the UE, wherein the second configuration includes the BFR-RS resource (i.e., the BFR-RS corresponding to the link with quality above the second threshold from block 1204) indicated in the report as an RLM-RS resource (e.g., so the UE can determine in-sync or out-of-sync based on the BFR-RS resource).

According to aspects of the present disclosure, a network entity (e.g., a gNB) may configure X RLM-RS resource(s)

and Z BFR-RS resource(s) at a UE, as described above in blocks 1202 and 1102 of FIGS. 11-12.

In aspects of the present disclosure, the network entity may configure periodic OOS indications (e.g., periodic indications that beams are out-of-sync) for the UE if an estimated link quality corresponding to a hypothetical PDCCH block error rate (BLER), based on Y configured RLM-RS resource(s), is below a first threshold. Y may be less than or equal to X. That is, the UE may be configured to trigger (e.g., send from L1 to higher protocol layers) OOS indications if a link quality corresponding to a desired BLER of a hypothetical PDCCH received on any one of Y RLM-RS resources is below a first threshold (i.e., the link quality is too low for transmission of a PDCCH with the desired BLER or a lower BLER), and in some cases (e.g., Y=X), the Y RLM-RS resources are all of the RLM-RS resources configured on the UE. If Y and X are equal, then one link quality corresponding to the desired BLER of one hypothetical PDCCH being higher than the first threshold prevents an OOS indication from being triggered. The triggered OOS indication may be an example of a first indication of first link quality, as described above with reference to block 1104 in FIG. 11.

According to aspects of the present disclosure, the network entity may configure periodic OOS indications (e.g., periodic indications that beams are out-of-sync) for the UE if an estimated link quality corresponding to a hypothetical desired PDCCH BLER based on W configured BFR-RS resource(s) is below a second threshold (that is, link quality on W BFR-RS resources is too low for transmission of a PDCCH with the desired BLER or a lower BLER). W may be less than or equal to Z. That is, the UE may be configured to trigger (e.g., send from L1 to higher protocol layers) OOS indications if link quality corresponding a desired BLER of a hypothetical PDCCH received on W BFR-RS resources is below a second threshold, and in some cases (e.g., W=Z), the W BFR-RS resources are all of the BFR-RS resources configured on the UE. The UE not triggering an OOS indication based on BFR-RS resources may be an example of a second indication of second link quality, as described above with reference to block 1104 in FIG. 11.

In aspects of the present disclosure, the network entity may configure the UE to send an indication (e.g., to the network entity) when the UE triggers one or more periodic OOS based on Y RLM-RS resource(s) and no periodic OOS are triggered based on W BFR-RS resource(s). That is, the UE sends an indication to the network entity that the UE cannot communicate with the network entity via Y RLM-RS resources but can communicate via at least one BFR-RS resource(s).

According to aspects of the present disclosure, a UE may send the indication (that the UE has triggered one or more periodic OOS based on Y RLM-RS resources and no periodic OOS are triggered based on W BFR-RS resources) via at least one of a PUCCH, a PUSCH, and an SRS.

In aspects of the present disclosure, a UE may send a report including the indication (that the UE has triggered one or more periodic OOS based on Y RLM-RS resources and no periodic OOS are triggered based on W BFR-RS resources) via at least one of radio resource control (RRC) signaling or a medium access control (MAC) control element (MAC-CE). The report may carry one or more identifiers of NR-SS or CSI-RS that are present in Z BFR-RS resource(s). The NR-SS or CSI-RS identifiers may identify one or more of the BFR-RS resources for which a BLER of a hypothetical PDCCH is below the second threshold (e.g., the identifier(s) indicate a BFR-RS resource matching a beam which the UE can use to communicate with the network entity).

According to aspects of the present disclosure, when the UE triggers one or more periodic OOS based on Y RLM-RS resource(s) and no periodic OOS based on W BFR-RS resource(s) as described above, the UE may pause counting periodic OOS indications based on X RLM-RS resources towards N310 for a duration of T ms and/or until the UE receives an additional message (e.g., a configuration changing the RLM-RS resources and/or the BFR-RS resources) from the network entity. T may be a predetermined value (e.g., from a network standard) or may be configured on the UE by the network entity or another network entity. If the UE pauses counting the OOS indications towards N310, the UE may maintain a separate count of the OOS indications that occur during the pausing of the counting and add the separate count to the count when the pause is over, or, alternatively, the UE may resume the count of the OOS indications when the pause is over without considering any OOS indications that occurred during the pause.

In aspects of the present disclosure, when the UE triggers one or more periodic OOS based on Y RLM-RS resource(s) and no periodic OOS based on W BFR-RS resource(s) as described above, the UE may pause or hold a T310 timer for a duration of T ms, or the UE may pause or hold the T310 timer until the UE receives an additional message from the network. T may be a predetermined value (e.g., from a network standard) or may be configured on the UE by the network entity (i.e., the network entity configuring the Y RLM-RS resources and the W BFR-RS resources on the UE) or another network entity.

According to aspects of the present disclosure, when the UE triggers one or more periodic OOS based on Y RLM-RS resource(s) and no periodic OOS based on W BFR-RS resource(s) as described above, the UE may increase N310 to a specific value or by a certain amount (e.g., as configured by the network). Additionally or alternatively, the UE may increase T310 to a specific value or increase T310 by T ms. T may be a predetermined value (e.g., from a network standard) or may be configured on the UE by the network entity (i.e., the network entity configuring the Y RLM-RS resources and the W BFR-RS resources on the UE) or another network entity.

In aspects of the present disclosure, when the UE triggers one or more periodic OOS based on Y RLM-RS resource(s) and no periodic OOS based on W BFR-RS resource(s) as described above, the UE may add, remove, and/or replace one or more of X RLM-RS resource(s) using the Z BFR-RS resource(s) and notify the network entity (i.e., the network entity configuring the Y RLM-RS resources and the W BFR-RS resources on the UE) of the changes in a report.

According to aspects of the present disclosure, when the UE triggers one or more periodic OOS based on Y RLM-RS resource(s) and no periodic OOS based on W BFR-RS resource(s) as described above, the UE may report one or more of the Z BFR-RS resource(s). The network entity may then transmit one or more of NR-SS, RMSI, or PBCH via the reported BFR-RS resource(s).

According to aspects of the present disclosure, upon reception of a report from a UE that the UE has triggered one or more OOS based on Y RLM-RS resource(s) and no periodic OOS based on W BFR-RS resource(s) as described above, the network (e.g., a gNB) may reconfigure (e.g., add, replace, and/or delete) one or more of X RLM-RS resource(s) in a second configuration. This may be an example of providing a second configuration to the UE, as described above with reference to block 1206 in FIG. 12.

According to aspects of the present disclosure, upon obtaining a second configuration of X RLM-RS resource(s) as described above, the UE may advance an N310 count (i.e., cease a pause in counting of OOS indications, as mentioned above) or a T310 timer (i.e., cease holding the T310 timer, as mentioned above).

Figure 13:
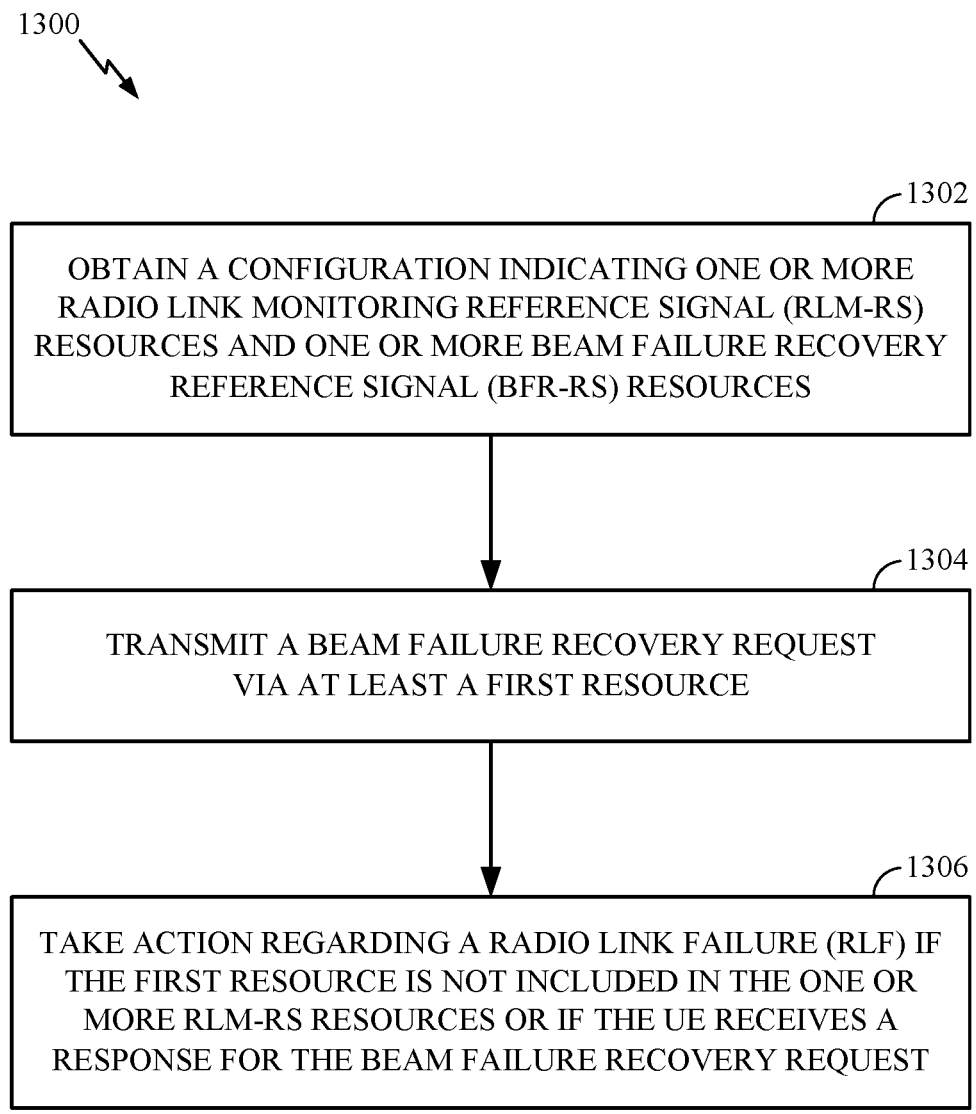
FIG. 13 illustrates example operations performed by a UE, in accordance with certain aspects of the present disclosure.

FIG. 13 illustrates example operations 1300 which may be performed by a UE (e.g., UE 120, shown in FIG. 1, or UE 804, shown in FIG. 8), according to aspects of the present disclosure. The UE may include one or more modules of UE 120 illustrated in FIG. 4.

At block 1302, operations 1100 begin with the UE obtaining a configuration indicating one or more radio link monitoring reference signal (RLM-RS) resources and one or more beam failure recovery reference signal (BFR-RS) resources. For example, UE 804 obtains (e.g., receives in a transmission from BS 802) a configuration indicating an RLM-RS resource (e.g., aligned with broadcast beam 806*b*) and a BFR-RS resource, (e.g., aligned with unicast beam 808*b*).

Operations 1300 continue at block 1304 with the UE transmitting a beam failure recovery request via at least a first resource. Continuing the example from above, the UE transmits a beam failure recovery request via at least a first resource (e.g., via a candidate beam that the UE selects, wherein the candidate beam is not included in the indicated RLM-RS resource obtained by the UE in block 1302. I.e., the candidate beam is not aligned with the broadcast beam 806*b*).

At block 1306, operations 1300 continue with the UE taking action regarding a radio link failure (RLF) when the first resource is not included in the one or more RLM-RS resources or when the UE receives a response for the beam failure recovery request. Continuing the example from above, the UE declares an RLF has occurred, because the candidate beam selected by the UE in block 1304 is not included in the RLM-RS resource in the configuration obtained by the UE at block 1302.

Figure 14:
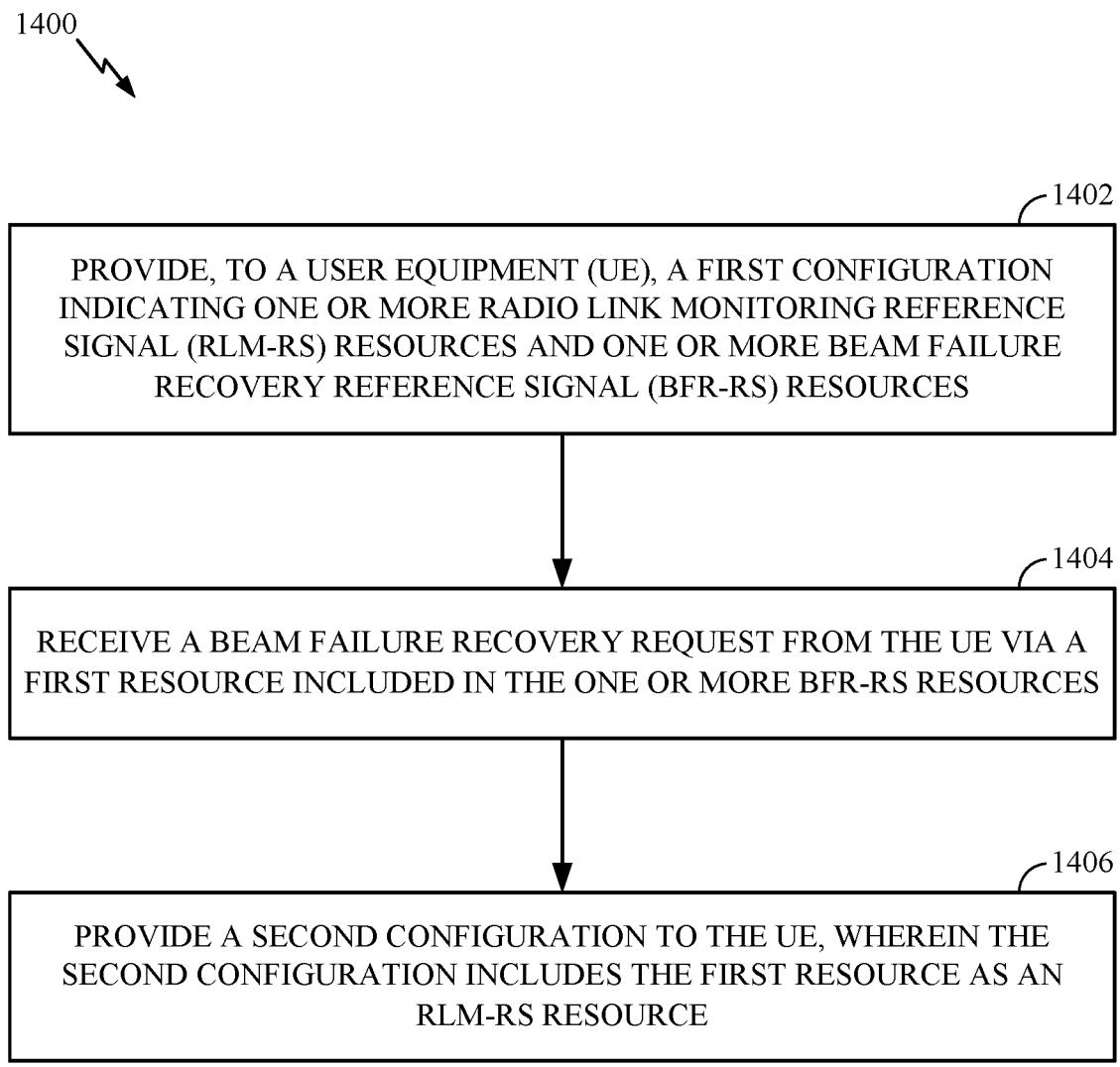
FIG. 14 illustrates example operations performed by a BS, in accordance with certain aspects of the present disclosure.

FIG. 14 illustrates example operations 1400 which may be performed by a BS (e.g., BS 110, shown in FIG. 1, or BS 802, shown in FIG. 8), according to aspects of the present disclosure. The BS may include one or more modules of BS 110 illustrated in FIG. 4. Operations 1400 may be considered complementary to operations 1300, shown in FIG. 13.

At block 1402, operations 1200 begin with the BS providing, to a user equipment (UE), a first configuration indicating one or more radio link monitoring reference signal (RLM-RS) resources and one or more beam failure recovery reference signal (BFR-RS) resources. For example, BS 802 provides (e.g., transmits), to UE 804 (shown in FIG. 8), a first configuration indicating an RLM-RS resource aligned with broadcast beam 806*b* and a BFR-RS resource aligned with unicast beam 808*b*.

Operations 1400 continue at block 1404 with the BS receiving a beam failure recovery request from the UE via a first resource included in the one or more BFR-RS resources. Continuing the example from above, the BS receives a beam failure recovery request from the UE via the unicast beam 808*b*.

At block 1406, operations 1400 continue with the BS providing a second configuration to the UE, wherein the second configuration includes the first resource as an RLM-RS resource. Continuing the example from above, the BS provides (e.g., transmits, implicitly indicates) a second configuration to the UE, wherein the second configuration includes the unicast beam 808*b* as an RLM-RS resource.

In aspects of the present disclosure, a BS may provide the second configuration to the UE (i.e., as described in block 1406 above), by implicitly indicating to the UE to use a default configuration, i.e., a configuration that the UE can derive without receiving from the BS. One technique of implicitly indicating to the UE to use the default configuration may be the BS acknowledging a beam failure recovery request (i.e., as described in block 1404 above) without transmitting a second configuration to the UE.

According to aspects of the present disclosure, a network entity (e.g., a gNB) may configure X RLM-RS resource(s) and Z BFR-RS resource(s) at a UE, as described above in blocks 1402 and 1302 of FIGS. 13-14.

In aspects of the present disclosure, the network entity may configure periodic IS indications (e.g., periodic indications that beams are in-sync) for the UE if an estimated link quality corresponding to a hypothetical PDCCH block error rate (BLER), based on at least one configured RLM-RS resource(s), is above a third threshold. That is, the UE may be configured to trigger (e.g., send from L1 to higher protocol layers) an IS indication if link quality corresponding to a desired BLER of a hypothetical PDCCH received on any one of the RLM-RS resources is above a third threshold.

According to aspects of the present disclosure, the network entity may configure suitability criteria on the UE for the UE to select a candidate beam for sending a beam failure recovery request. Suitability criteria may be based on CSI-RS or SS blocks that satisfy one or more threshold(s) (e.g., thresholds regarding OOS indications for BFR-RS resources, as described above with reference to FIGS. 11-12).

In aspects of the present disclosure, the UE may send a beam failure recovery request to the network entity (e.g., a gNB) on one or more of the candidate RS resource(s), as described above with reference to block 1304 of FIG. 13. For example, UE 804 (shown in FIG. 8) may be configured by gNB 802 with suitability criteria based on CSI-RS or SS blocks, e.g., as mentioned above. In the example, the UE may transmit a beam failure recovery request (e.g., as mentioned above in block 1304 of FIG. 13) on each of a plurality of candidate beams that the UE selects based on the suitability criteria According to aspects of the present disclosure, as the candidate RS resource(s) may not be part of the X RLM-RS resource(s) configured on the UE (e.g., see blocks 1302 and 1402 in FIGS. 13-14), L1 of the protocol stack of the UE may send periodic OOS indications to upper layers.

In aspects of the present disclosure, when the candidate RS resource is not part of the X RLM-RS resource(s) or when the beam failure recovery procedure is successful, i.e., the UE receives a response for the beam failure recovery request on one or more candidate beams, then the UE may pause counting periodic OOS indications based on X RLM-RS resources towards N310 for a duration of T ms and/or until the UE receives an additional message from the network entity. T may be a predetermined value (e.g., from a network standard) or may be configured on the UE by the network entity or another network entity.

According to aspects of the present disclosure, when the candidate RS resource is not part of the X RLM-RS resource(s) or when the beam failure recovery procedure is successful, then the UE may pause or hold a T310 timer for a duration of T ms and/or until the UE receives an additional message from the network entity. T may be a predetermined value (e.g., from a network standard) or may be configured on the UE by the network entity or another network entity.

In aspects of the present disclosure, when the candidate RS resource is not part of the X RLM-RS resource(s) or when the beam failure recovery procedure is successful, then the UE may increase N310 to a specific value or by a delta (e.g., as configured by the network entity) and/or the UE may increase T310 to a specific value or increase T310 by T ms. T may be a predetermined value (e.g., from a network standard) or may be configured on the UE by the network entity or another network entity.

According to aspects of the present disclosure, upon reception of beam failure recovery request message as described above in block 1404 of FIG. 14, a network entity (e.g. a gNB) may reconfigure (e.g., add, replace, and/or delete) one or more of X RLM-RS resource(s) and send a new configuration to the UE, as described above in block 1406 of FIG. 14.

In aspects of the present disclosure, upon receipt of a second configuration of X RLM-RS resource(s) by a UE as described above with reference to block 1404 of FIG. 14, the UE may advance an N310 count (i.e., cease pausing the counting of OOS indications) or a T310 timer (i.e., cease pausing the T310 timer).

According to aspects of the present disclosure, upon receipt of a second configuration of X RLM-RS resources by a UE as described above with reference to block 1404 of FIG. 14, the UE may use the RLM-RS resources of the second configuration for radio link monitoring.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

According to aspects, the means for receiving, means for transmitting, means for detecting, and means for taking one or more actions may be performed by one or more of antennas 452, Tx/Rx 454, processors 466, 458, 464, and/or controller/processor 480 of the UE 120 or the antenna 434, Tx/Rx 432, processors 420, 430, 438, and/or controller/processor 440 of the BS 110.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11-14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment, comprising:
    obtaining a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link;
    obtaining a first indication that a first link quality for the first link is below a first threshold and a second link quality for the second link is above a second threshold;
    taking action regarding a radio link failure (RLF) based on the first indication, the action comprising sending a report, wherein the report indicates:
        that the first link quality is below the first threshold;
        the second link quality is above the second threshold; and
        the BFR-RS resource corresponding to the second link; and
    obtaining a second configuration, wherein the second configuration indicates RLM-RS resources corresponding to the second link.

2. The method of claim 1, wherein taking action comprises:
    sending a second indication that the first link quality is below the first threshold and the second link quality is above the second threshold.

3. The method of claim 2, wherein sending the second indication comprises:
    sending the second indication via one of a physical uplink control channel (PUCCH), a physical uplink shared channel, or a sounding reference signal (SRS).

4. The method of claim 1, wherein taking action comprises:
    ceasing counting out-of-synchronization (OOS) indications based on the RLM-RS resources.

5. The method of claim 4, further comprising:
    starting a timer; and
    continuing counting the OOS indications based on the RLM-RS resources upon expiration of the timer.

6. The method of claim 4, further comprising:
    receiving a message from a network; and
    continuing counting the OOS indications based on the RLM-RS resources in response to the message.

7. The method of claim 1, wherein taking action comprises:
pausing an out-of-synchronization (OOS) timer.

8. The method of claim 1, wherein taking action comprises:
increasing a threshold number of out-of-synchronization (OOS) indications.

9. The method of claim 1, wherein taking action comprises:
increasing a limit of an out-of-synchronization (OOS) timer.

10. The method of claim 1, wherein taking action comprises:
removing one of the RLM-RS resources from the first configuration.

11. The method of claim 1, wherein taking action comprises:
adding one of the BFR-RS resources to the RLM-RS resources.

12. A method for wireless communications performed by a base station, comprising:
providing, to a user equipment (UE), a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link;
obtaining from the UE a report that indicates a first link quality for the first link is below a first threshold, a second link quality for the second link is above a second threshold, and the BFR-RS resource corresponding to the second link; and
providing a second configuration to the UE, wherein the second configuration indicates RLM-RS resources corresponding to the second link.

13. The method of claim 12, wherein the first configuration indicates one or more RLM-RS resources that are not indicated in the second configuration.

14. The method of claim 12, wherein the second configuration indicates one or more RLM-RS resources that are not indicated in the first configuration.

15. An apparatus for wireless communication comprising:
at least one processor;
a transceiver communicatively coupled to the at least one processor; and
a memory coupled to the at least one processor, wherein the at least one processor is configured to:
obtain a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link;
obtain a first indication that a first link quality for the first link is below a first threshold and a second link quality for the second link is above a second threshold;
take action regarding a radio link failure (RLF) based on the first indication, the action comprising sending a report, wherein the report indicates:
that the first link quality is below the first threshold;
the second link quality is above the second threshold; and
the BFR-RS resource corresponding to the second link; and
obtain a second configuration, wherein the second configuration indicates RLM-RS resources corresponding to the second link.

16. The apparatus of claim 15, wherein the at least one processor is further configured to:
send a second indication that the first link quality is below the first threshold and the second link quality is above the second threshold.

17. The apparatus of claim 16, wherein the at least one processor is further configured to:
send the second indication via one of a physical uplink control channel (PUCCH), a physical uplink shared channel, or a sounding reference signal (SRS).

18. The apparatus of claim 15, wherein the at least one processor is further configured to:
cease counting out-of-synchronization (OOS) indications based on the RLM-RS resources.

19. The apparatus of claim 18, wherein the at least one processor is further configured to:
start a timer; and
continue counting the OOS indications based on the RLM-RS resources upon expiration of the timer.

20. The apparatus of claim 18, wherein the at least one processor is further configured to:
receive a message from a network; and
continuing counting the OOS indications based on the RLM-RS resources in response to the message.

21. The apparatus of claim 15, wherein the at least one processor is further configured to:
pause an out-of-synchronization (OOS) timer.

22. The apparatus of claim 15, wherein the at least one processor is further configured to:
increase a threshold number of out-of-synchronization (OOS) indications.

23. The apparatus of claim 15, wherein the at least one processor is further configured to:
increase a limit of an out-of-synchronization (OOS) timer.

24. The apparatus of claim 15, wherein the at least one processor is further configured to:
remove one of the RLM-RS resources from the first configuration.

25. The apparatus of claim 15, wherein the at least one processor is further configured to:
add one of the BFR-RS resources to the RLM-RS resources.

26. An apparatus for wireless communication comprising:
at least one processor:
a transceiver communicatively coupled to the at least one processor; and
a memory coupled to the at least one processor, wherein the at least one processor is configured to:
provide, to a user equipment (UE), a first configuration indicating one or more radio link monitoring reference signal (RLM-RS) resources and one or more beam failure recovery reference signal (BFR-RS) resources, wherein each RLM-RS resource corresponds to at least a first link, and each BFR-RS resource corresponds to at least a second link;
obtain from the UE a report that indicates a first link quality for the first link is below a first threshold, a second link quality for the second link is above a second threshold, and the BFR-RS resource corresponding to the second link; and
provide a second configuration to the UE, wherein the second configuration indicates RLM-RS resources corresponding to the second link.

27. The apparatus of claim 26, wherein the first configuration indicates one or more RLM-RS resources that are not indicated in the second configuration.

28. The apparatus of claim 26, wherein the second configuration indicates one or more RLM-RS resources that are not indicated in the first configuration.

* * * * *